(12) United States Patent
Chan

(10) Patent No.: US 6,900,701 B2
(45) Date of Patent: May 31, 2005

(54) AUTOMATIC DETECTION, SELECTION AND CONFIGURATION OF CLOCK OSCILLATOR CIRCUITRY

(75) Inventor: Brian P. Lum Shue Chan, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 26 days.

(21) Appl. No.: 10/403,705

(22) Filed: Mar. 31, 2003

(65) Prior Publication Data

US 2004/0189408 A1 Sep. 30, 2004

(51) Int. Cl.$^7$ ................................................ H03B 1/00
(52) U.S. Cl. ........................... 331/74; 331/135; 331/49; 331/185
(58) Field of Search ............................ 331/74, 135, 49, 331/185; 370/241, 537

(56) References Cited

U.S. PATENT DOCUMENTS 3,725,681 A * 4/1973 Frederiksen ................ 307/273
4,949,052 A * 8/1990 Chigira ......................... 331/49
6,700,872 B1 * 3/2004 Hann et al. .................. 370/241
6,731,658 B1 * 5/2004 Inazumi et al. ............. 370/537

* cited by examiner

Primary Examiner—Michael B Shingleton
(74) Attorney, Agent, or Firm—W. Daniel Swayze, Jr.; W. James Brady; Frederick J. Telecky, Jr.

(57) ABSTRACT

Oscillator circuitry on an integrated circuit automatically detects the presence or absence of an external resistor which is used to bias and set the frequency of an internal resistor-capacitor (RC) oscillator. If the resistor is present, the RC oscillator begins to oscillate to generate an oscillator clock. The presence of the oscillator clock is detected, and the RC oscillator continues to generate the oscillator clock. If the resistor is not present, the RC oscillator does not begin to oscillate. The absence of the oscillator clock is detected, and the oscillator circuitry automatically re-configures itself to generate the oscillator clock from an internal crystal oscillator circuit employing an external crystal.

33 Claims, 8 Drawing Sheets

AUTOMATIC DETECTION, SELECTION AND CONFIGURATION OF CLOCK OSCILLATOR CIRCUITRY

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The invention is related to the field of circuits for generating clock signals.

Various types of clock oscillator circuits for generating clock signals are known. Classes of such circuits include so-called resistor-capacitor (RC) oscillators, in which the oscillation frequency is determined by an RC time constant and the circuit operates by alternately charging and discharging the capacitor. Also included are so-called crystal oscillator circuits, which exploit the piezo-electric properties of a crystal to generate a clock signal of a generally very precise frequency.

It is also known to incorporate portions of oscillator circuits such as RC or crystal oscillator circuits in a semiconductor device. Typically, the timing components such as the resistor and/or capacitor for an RC oscillator, or the crystal for a crystal oscillator, reside off-chip. This requires the use of one or more input/output pins of the chip to interconnect these timing components with the on-chip circuitry.

For various reasons including cost, it is generally desired to minimize the number of input/output pins used for the various functions of a chip. It is also desirable that semiconductor devices be as simple and flexible in their use as possible. These goals extend to the clock generating function.

BRIEF SUMMARY OF THE INVENTION

In accordance with the present invention, oscillator circuitry that is flexible and easy to use is disclosed.

The disclosed oscillator circuitry includes two separate oscillators, either of which may be desired for use by a given user. In an illustrated embodiment, a resistor-capacitor (RC) oscillator and a crystal oscillator are provided. The oscillator circuitry can be deployed in systems that require either type of oscillator, giving a user enhanced flexibility.

The disclosed oscillator circuitry further includes circuitry that automatically performs a configuration process upon start-up or reset to select one of the oscillators, depending on the configuration of an integrated circuit on which the oscillator circuitry resides. In the illustrated case of an RC oscillator and a crystal oscillator, the configuration process automatically detects the presence or absence of an external resistor which is used to bias and set the frequency of the RC oscillator. If the resistor is present, the RC oscillator begins to oscillate to generate an oscillator clock. The presence of the oscillator clock is detected, and the RC oscillator continues to be selected for operation of the integrated circuit. If the resistor is not present, the RC oscillator does not begin to oscillate, so that the oscillator clock is not present. The absence of the oscillator clock is detected, and the oscillator circuitry automatically re-configures itself to generate the oscillator clock from a crystal oscillator circuit employing an external crystal.

The disclosed oscillator circuitry has several advantageous features. One input/output pin of the integrated circuit is sharable between the two configurations, i.e., either a resistor may be connected to the pin, or one terminal of a crystal may be connected. The configuration process and subsequent operation are performed automatically at start-up and upon reset, and do not require any user intervention. Also, only the selected oscillator is powered for operation after the configuration process is complete, resulting in reduced power consumption.

Other aspects, features, and advantages of the present invention will be apparent from the Detailed Description of the Invention that follows.

BRIEF DESCRIPTION OF THE SEVERAL VIEWS OF THE DRAWING

The invention will be more fully understood by reference to the following Detailed Description of the Invention in conjunction with the Drawing, of which:

FIG. 2 (consisting of FIGS. 2a and 2b) is a schematic diagram of clock oscillator circuitry in the system of FIG. 1;

DETAILED DESCRIPTION OF THE INVENTION

Figure 1:
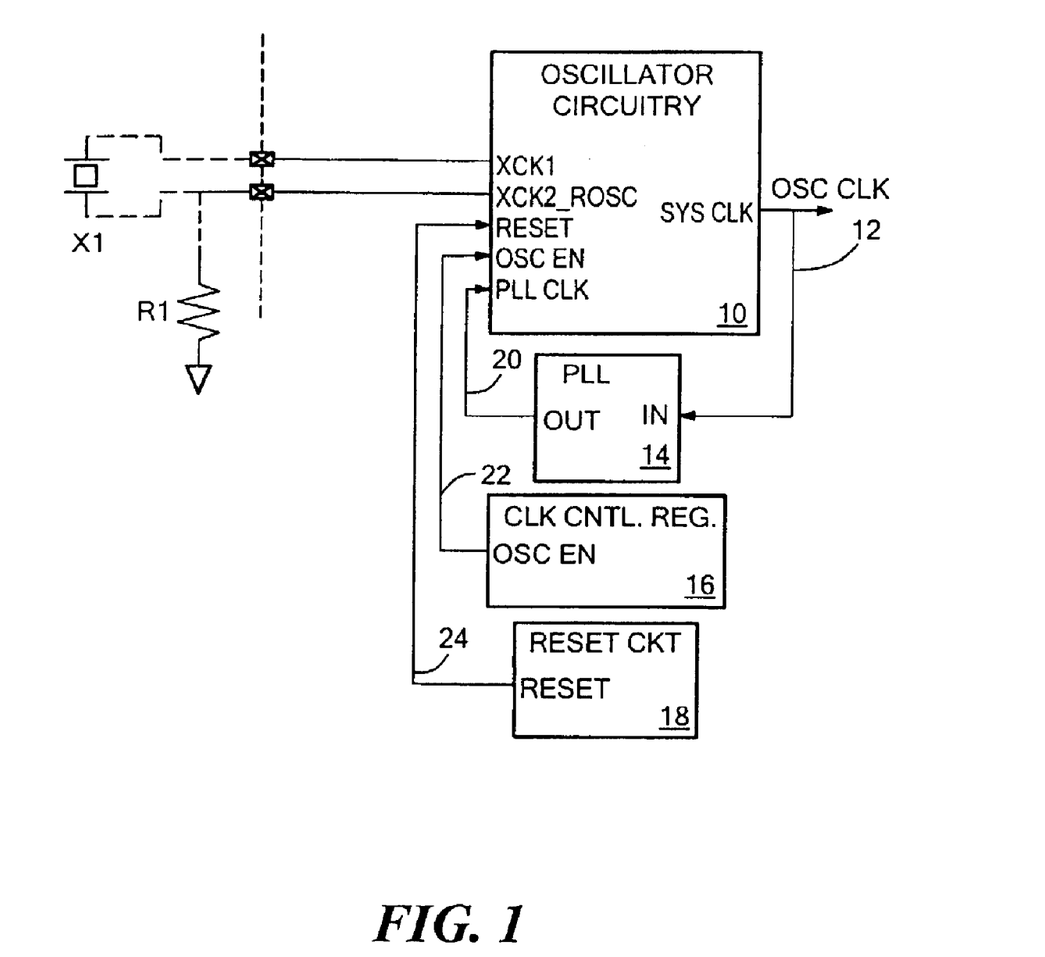
FIG. 1 is a block diagram of a system employing clock oscillator circuitry in accordance with the present invention.

In FIG. 1, oscillator circuitry 10 resides on an integrated circuit or "chip" and generates an oscillator clock (OSC CLK) 12. The oscillator circuitry 10 works in conjunction with on-chip phase-lock-loop (PLL) circuitry 14, a programmable clock control register 16, and reset circuitry 18. The oscillator circuitry 10 also receives two inputs labeled "XCK1" and "XCK2__ROSC" from respective input/output pins of the chip. These pins may be connected to a crystal X1, in which case the oscillator clock signal 12 is generated from a crystal-controlled oscillator circuit (not shown in FIG. 1) within the oscillator circuitry 10. Alternatively, the pin XCK2__ROSC may be connected to a resistor R1, in which case the oscillator clock 12 is generated from a resistor-capacitor (RC) oscillator (also not shown in FIG. 1) within the oscillator circuitry 10.

The PLL 14 generates a PLL clock (PLL CLK) 20 that is phase-locked to the oscillator clock signal 12 if present. However, the PLL clock 20 is present even in the absence of the oscillator clock signal 12. In such a case, the frequency of the PLL clock 20 is only approximately equal to the frequency of the oscillator clock signal 12 when present, due to the absence of an input clock to lock onto. It will be appreciated that the exact frequency of the PLL clock 20 in the absence of the oscillator clock signal 12 may be anywhere in a range of frequencies as determined by several factors, including the characteristics of variable oscillator circuitry within the PLL 14, external circuit conditions, etc. It will be appreciated in light of the description below that proper circuit operation results as long as the frequency of the PLL clock 20 is within a predetermined range in the absence of the oscillator clock signal 12.

The clock control register 16 generates an oscillator enable signal (OSC EN) 22, providing for programmable control over the operation of the oscillator circuitry 10 at the system level.

The reset circuitry 18 generates a reset signal (RESET) 24 which is used to initiate operation by the oscillator circuitry 10 in a manner described below. The reset signal 24 is generated automatically at power-up, and can be generated under program control without cycling power.

Figures 2, 2A:
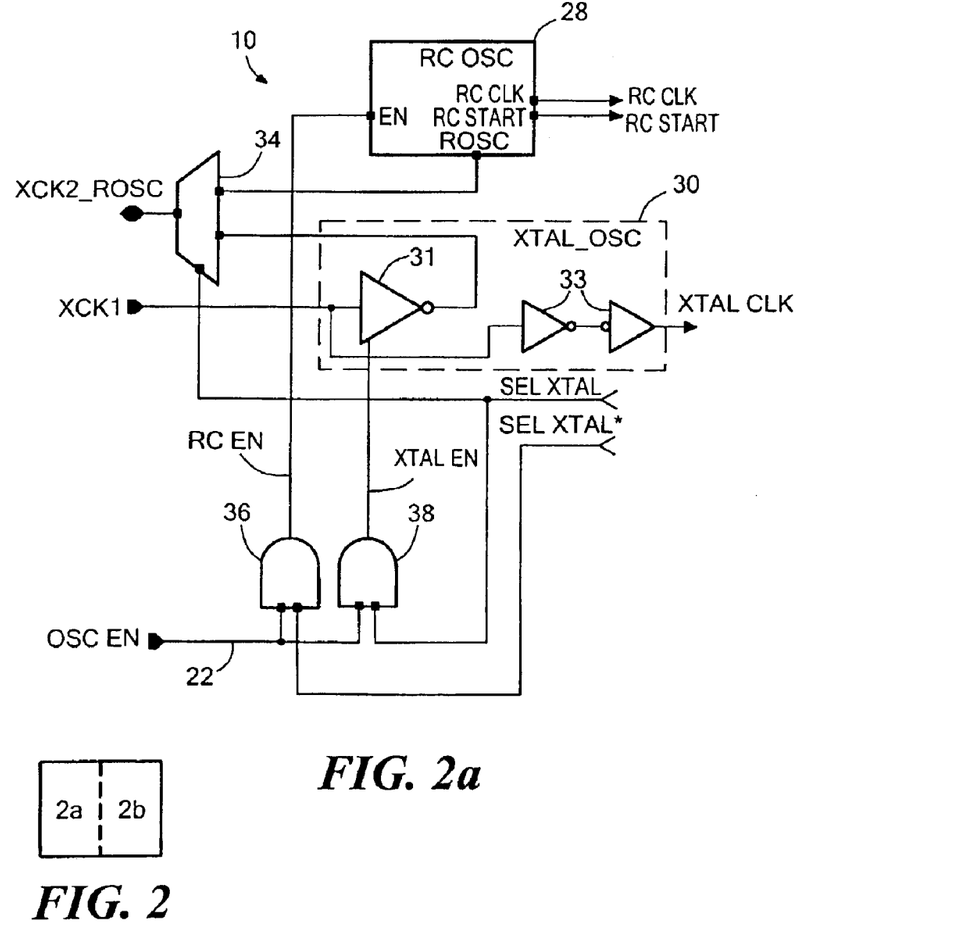
Figure 2B:
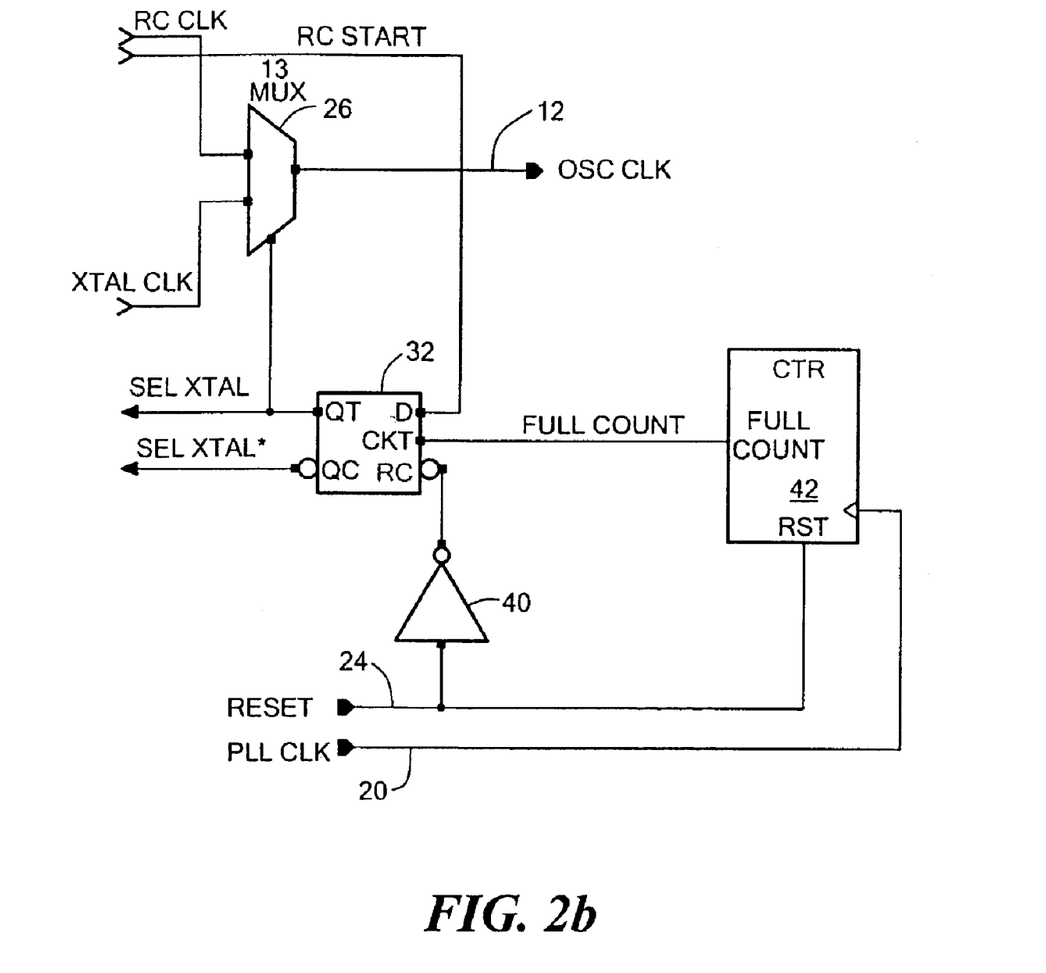

FIG. 2 shows the oscillator circuitry 10. The oscillator clock signal 12 is generated by a multiplexer 26 which receives a first input RC CLK from an RC oscillator circuit 28 and a second input XTAL CLK from a crystal oscillator circuit 30. As shown, the crystal oscillator circuit 30 includes an inverting amplifier 31 which can be enabled and a pair of inverters 33. The multiplexer 26 is a digital multiplexer controlled by a signal SEL XTAL generated by a flip/flop 32. A second, analog, multiplexer 34 connects the input/output node XCK2_ROSC to either a terminal ROSC of the RC oscillator 28 or to the output of the amplifier 31 of the crystal oscillator 30. This selection is also made in response to the value of the signal SEL XTAL. The oscillator enable signal 22 (see FIG. 1) is provided to AND gates 36 and 38 which selectively enable the RC oscillator 28 or the crystal oscillator 30 based on whether the SEL XTAL signal or its complement SEL XTAL* is asserted. The RC oscillator circuit 28 generates a signal RC START that is provided to the D input of the flip/flop 32.

The reset signal 24 is provided to the flip/flop 32 via an inverter 40, and is also provided to a counter 42. The output signal Full Count serves as a clock input to the flip/flop 32. The PLL clock 20 is provided to a clock input of the counter 42.

Figure 3:
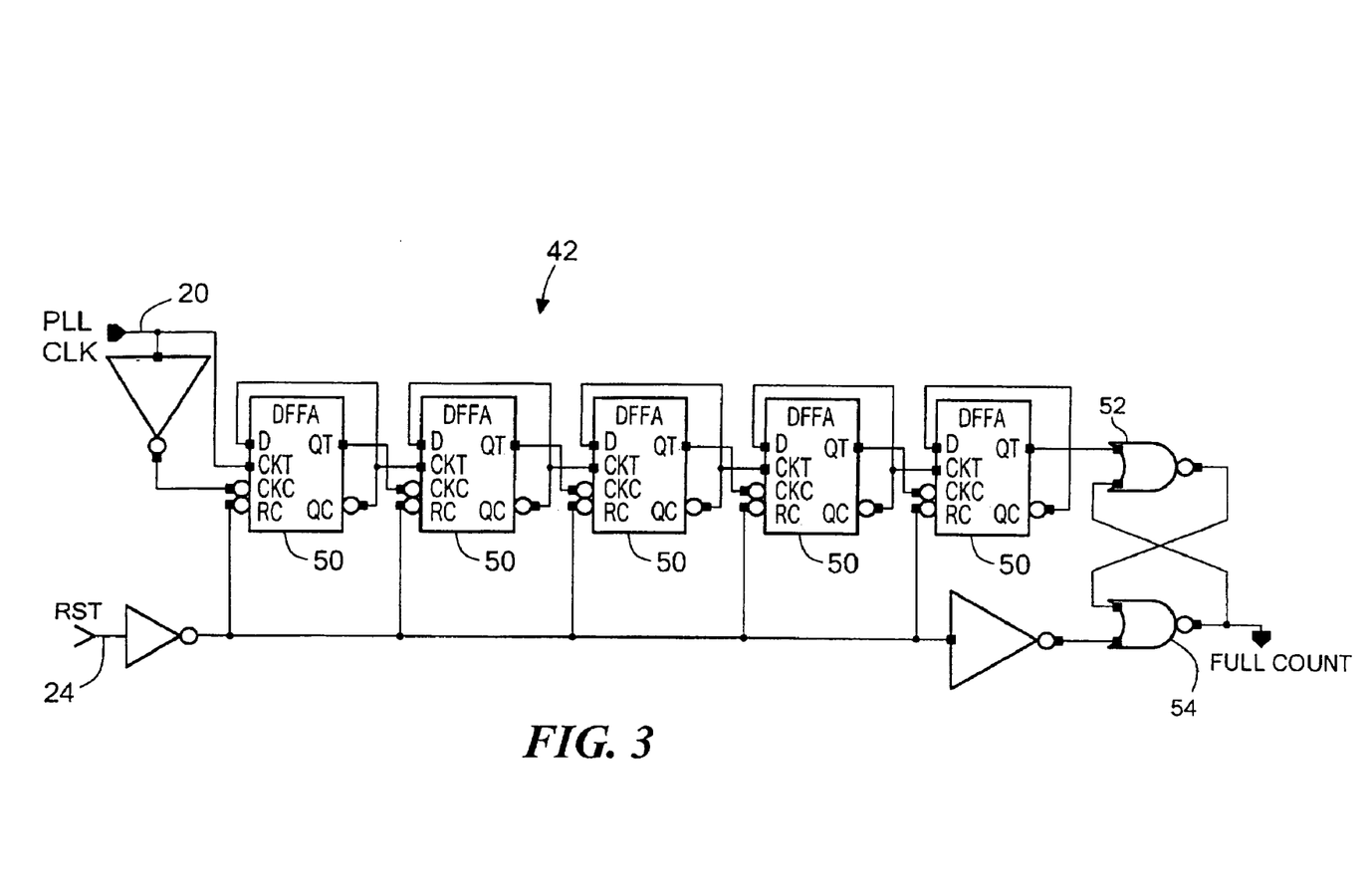
FIG. 3 is a schematic diagram of a counter in the clock oscillator circuitry of FIG. 2.

FIG. 3 shows that the counter 42 is a ripple counter having 5 stages 50. The first stage is driven by the PLL clock 20, and the final stage feeds a latch formed by cross-coupled NOR gates 52 and 54. The output of this latch is the signal FULL COUNT. The counter stages 50 and the latch consisting of NOR gates 52 and 54 are reset by the reset signal 24.

Figure 4:
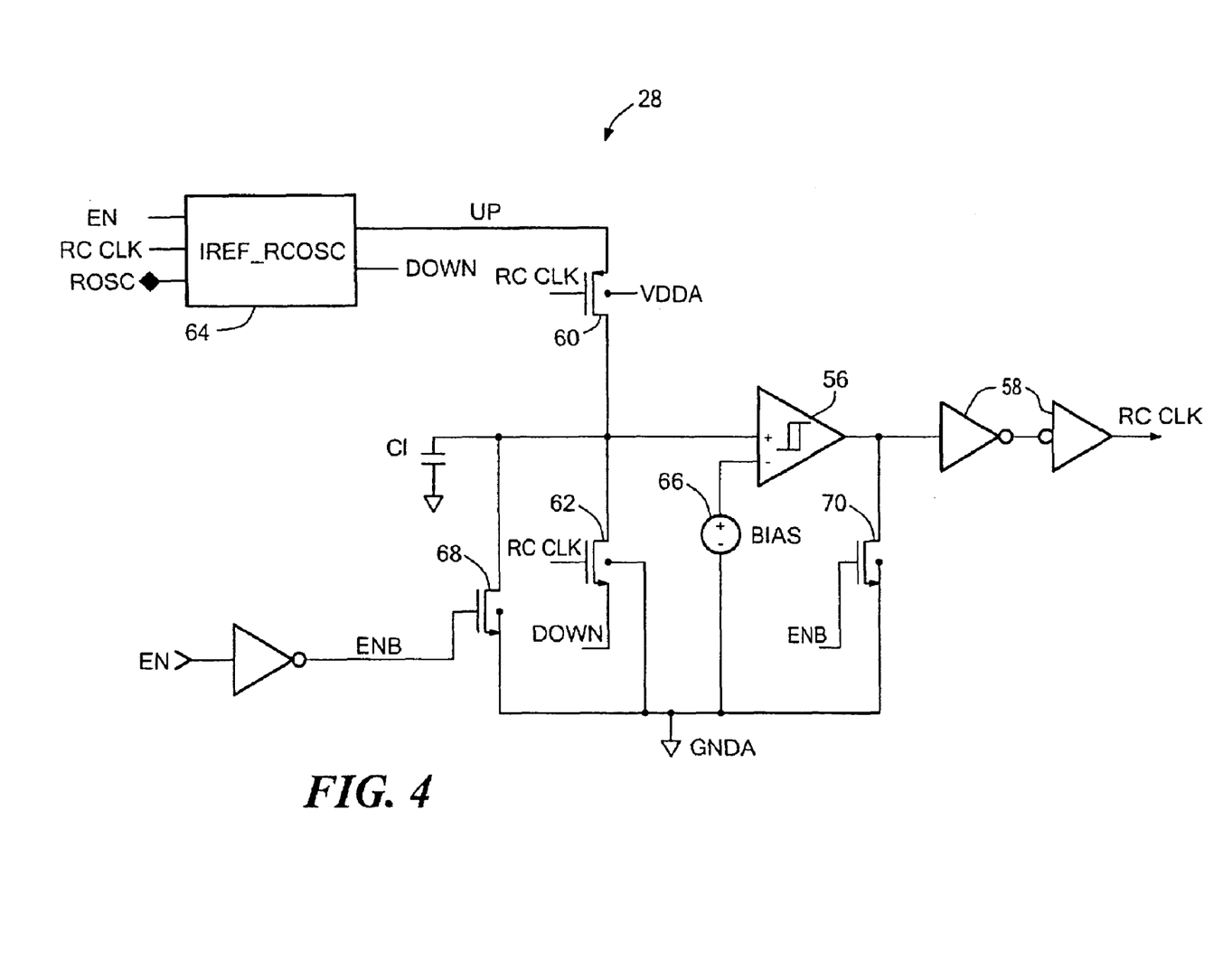
FIG. 4 is a schematic diagram of a resistor-capacitor (RC) oscillator circuit in the clock oscillator circuitry of FIG. 2.

FIG. 4 shows that the RC oscillator circuitry 28 includes a comparator 56 followed by two inverters 58. The non-inverting input of the comparator 56 is connected to a timing capacitor C1 and a pair of transistors 60 and 62. The upper transistor 60 is active when the output signal RC CLK is low, and passes a charge current UP generated by a current reference circuit ("iref_rcosc") 64 that charges the capacitor C1. The lower transistor 62 is active when the output signal RC CLK is high, and passes a discharge current DOWN generated by iref_rcosc 64 that discharges the capacitor C1. The inverting input of the comparator 56 is connected to a bias source 66. When the RC oscillator 28 is disabled by de-assertion of the input signal EN, a transistor 68 discharges the capacitor C1 and the transistor 70 forces the output of the comparator 56 low.

When the enable signal EN is asserted and the currents UP and DOWN are being generated by the current reference circuit 64, the RC oscillator 28 oscillates to generate the RC CLK in the following manner. Since the non-inverting input of the comparator 56 is initially forced low, RC CLK is initially a logic "low", and transistor 60 is turned on to provide the charging current UP to the capacitor C1. When the voltage on the capacitor C1 gets sufficiently high, as determined by the value of the bias voltage from bias generator 66 and the amount of hysteresis exhibited by the comparator 56, the output of the comparator 56 goes high. This drives RC CLK high as well, shutting off the transistor 60 and turning on the transistor 62. The discharge current DOWN then begins discharging the capacitor C1. When the voltage on the capacitor C1 gets sufficiently low, as also determined by the bias voltage from the bias generator 66 and the hysteresis of the comparator 56, the output of the comparator 56 goes low. This drives RC CLK back to a low level. This cycling of RC CLK from low to high continues at a frequency determined by the capacitance of capacitor C1, the amount of hysteresis in the comparator 56, and the magnitude of the charging and discharging currents UP and DOWN, which in turn are controlled by the value of the resistor R1.

Figure 5:
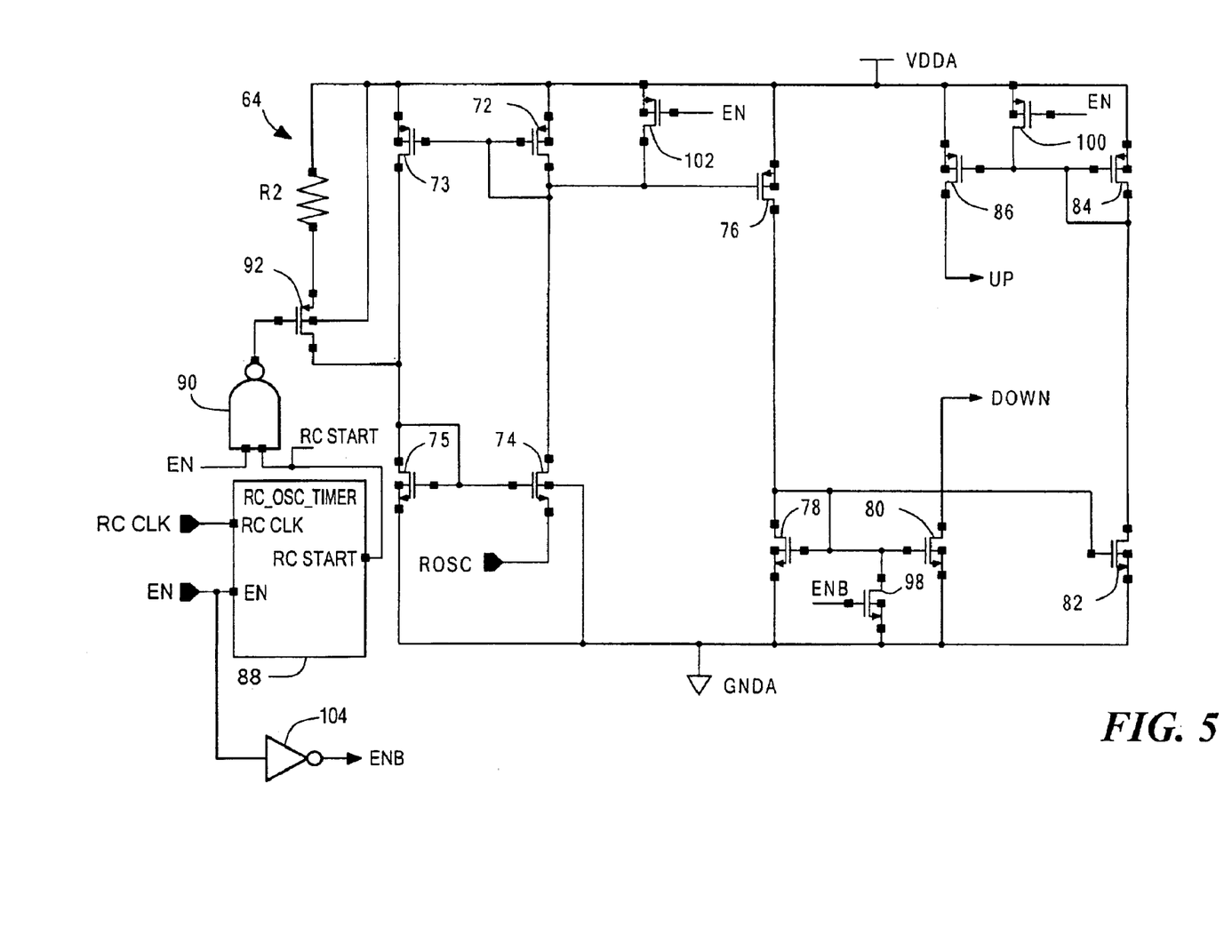
FIG. 5 is a schematic diagram of a current reference circuit in the RC oscillator circuit of FIG. 4.

FIG. 5 shows the current reference circuit 64. Transistors 72, 73, 74 and 75 establish a reference current having a value determined by the resistor R1 (FIG. 1) via the node ROSC (assuming R1 is connected; otherwise, no reference current is established). The reference current is mirrored through transistors 76, 78, 80, 82, 84 and 86 to generate the currents UP and DOWN. Startup circuitry consisting of a timer ("rc_osc_timer") 88, NAND gate 90, resistor R2, and transistor 92 establishes the reference current during the initial part of operation. Additional transistors 98, 100 and 102 receive either the enable signal EN or its complement ENB (created by inverter 104) to power-down the current reference circuit 64 when the RC oscillator 28 is disabled.

Figure 6:
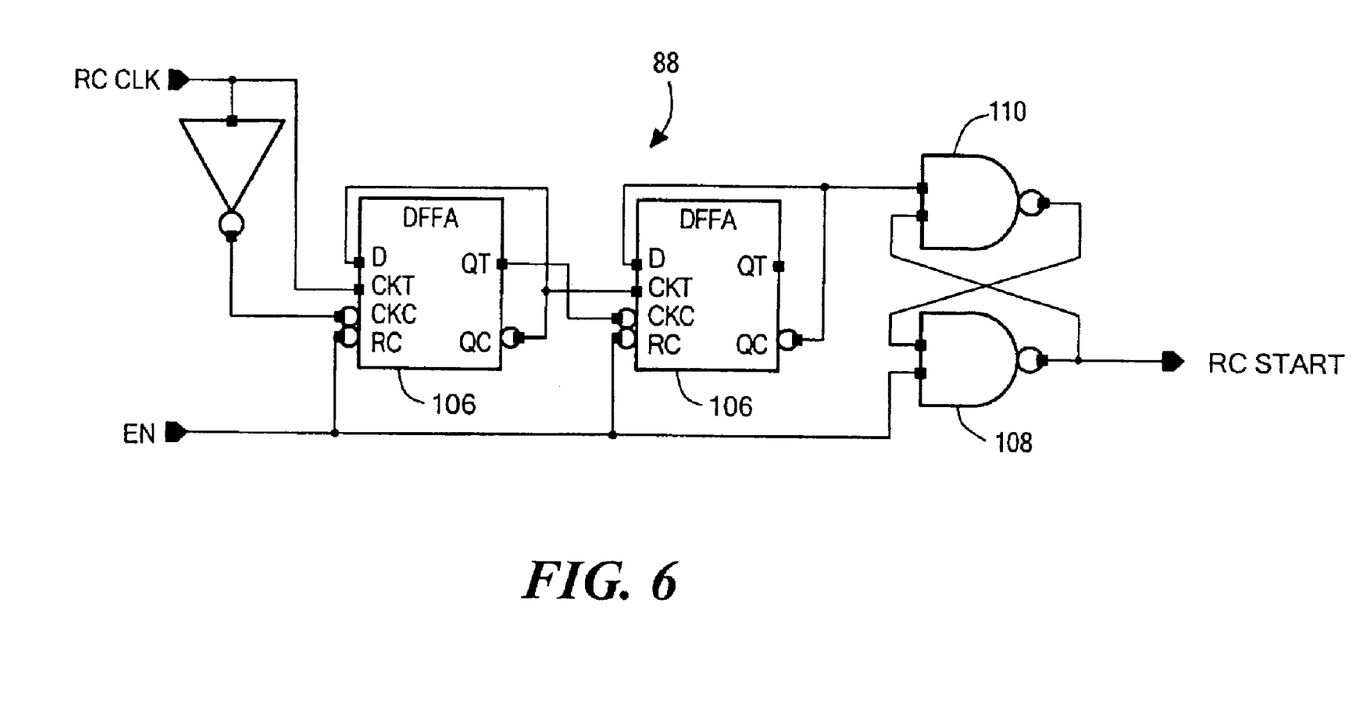
FIG. 6 is a schematic diagram of a counter in the current reference circuit of FIG. 5.

FIG. 6 shows that the rc_osc_timer 88 is a ripple counter with two stages 106 and an output latch consisting of cross-coupled NAND gates 108 and 110. When the enable input EN is de-asserted, the latch output RC START is set to 1, indicating that the RC oscillator 28 is in a starting mode of operation. Once the enable signal EN becomes asserted, if the clock input RC CLK is present, the counter counts two edges of RC CLK and sets the output latch, causing the signal RC START to become de-asserted. This condition indicates that the RC oscillator 28 is no longer in the starting mode, i.e., that it is running.

Figure 7:
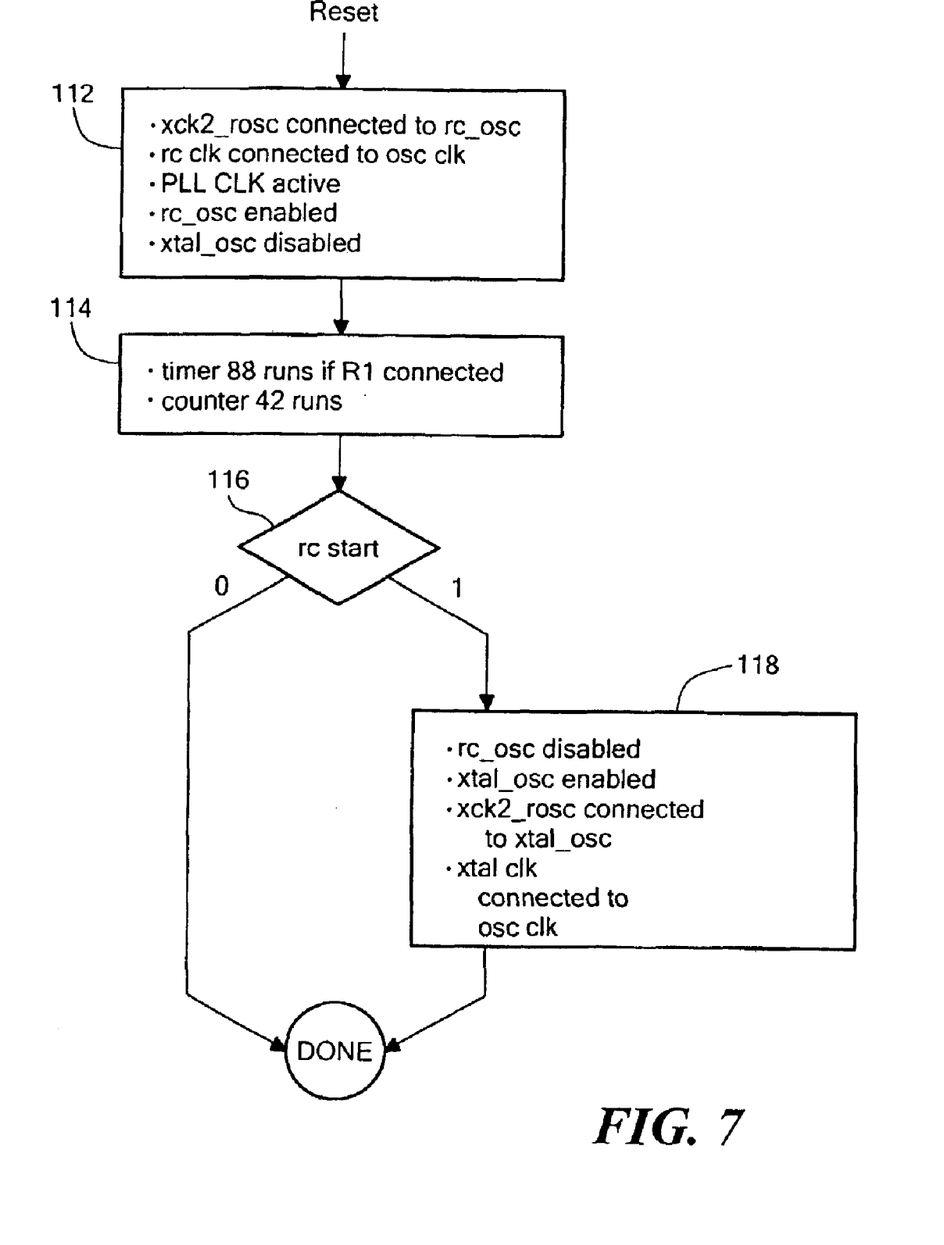
FIG. 7 is a flow diagram illustrating the operation of the clock oscillator circuitry of FIGS. 1–6.

FIG. 7 illustrates the overall operation of the oscillator circuitry 10. In response to a reset, the circuitry enters a state 112 in which operation from the RC CLK is attempted. In particular, the following things occur:
1. The signal SEL XTAL is de-asserted, such that (a) the xck2_rosc pin is connected to the ROSC input of the RC oscillator 28; and (b) RC CLK is selected as the source for OSC CLK (FIG. 2).
2. PLL CLK is active (although not necessarily accurate, as explained above).
3. The signal RC EN is asserted, enabling the operation of the RC oscillator 28, and the signal XTAL EN is de-asserted to disable the operation of the XTAL oscillator 30 (FIG. 2).

At this point, operation proceeds to state 114 of FIG. 7. The counter 42 (FIG. 2) is active, counting cycles of PLL CLK. If the resistor R1 is connected to the pin xck2_rosc, the current reference circuit 64 provides the currents UP and DOWN within the RC oscillator 28 (FIG. 4), causing the RC CLK signal to be generated at the desired frequency. Also, the rc_osc_timer 88 detects the first two cycles of RC CLK, and de-asserts the signal RC START. If on the other hand the resistor R1 is not connected, the RC oscillator 28 does not run and the signal RC START does not become de-asserted.

When the counter 42 reaches its full count, the value of the signal RC START is transferred into the flip/flop 32

(FIG. 2). At this point, operation depends on the transferred value, as illustrated at step 116 of FIG. 7. If the latched value is 0, then the RC oscillator 28 is active and is generating OSC CLK 12 via the multiplexer 26 (FIG. 2). No further action is necessary, because this is the desired mode of operation.

If at step 116 the latched value of RC START is 1, then the circuit enters state 118 to establish operation from the XTAL oscillator circuit 30. In particular, the following things occur:
1. The signal SEL XTAL becomes asserted, such that (a) the xck2_rosc pin is connected to the output of the amplifier 31, and (b) XTAL CLK is selected as the source for OSC CLK (FIG. 2).
2. The signal XTAL EN is asserted to enable the operation of the XTAL oscillator 30, and the signal RC EN is deasserted to disable the operation of the RC oscillator 28 (FIG. 2).

In this mode of operation, if the crystal X1 (FIG. 1) is connected across the pins xckl and xck2_rosc, the XTAL oscillator 30 will generate the oscillator clock 12 via the signal XTAL CLK and the multiplexer 26 (FIG. 2).

Although in the above description, the presence of the RC CLK signal is detected by counting two cycles of RC CLK to generate RC START and then sampling RC START after the counter 42 has reached its full count, this determination can be made in other ways in alternative embodiments. In general, it is necessary to give the RC oscillator 28 sufficient time to start before making the determination. It can be known by design and simulation what the latest starting time for the RC oscillator will be and the time required to detect the start (which in the illustrated embodiment is two cycles of RC CLK). It can also be known what the earliest sampling time will be. In the illustrated embodiment, this is determined by the maximum frequency of PLL CLOCK 20 and the number of cycles of PLL CLOCK that are counted in counter 42. The earliest sampling time must be longer than the latest time at which the start of the RC oscillator 28 can be detected.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:
1. A method of generating a clock signal for an electronic device, comprising:
monitoring an output of a first oscillator to detect the presence of a first oscillator signal, the first oscillator signal being generated by the first oscillator when the electronic device has a first configuration;
if the first oscillator signal is present, selecting the first oscillator signal as the source of the clock signal; and
if the first oscillator signal is determined not to be present, selecting a second oscillator signal as the source of the clock signal, the second oscillator signal being generated by a second oscillator when the electronic device has a second configuration, wherein monitoring comprises:
counting cycles of the first oscillator signal; and
determining whether a predetermined count of cycles has been reached by a predetermined time,
wherein the predetermined time is established by counting cycles of a separate clock signal, and
wherein the separate clock signal comprises a phase-lock-loop (PLL) clock signal of a phase lock loop (PLL).

2. A method according to claim 1, wherein the predetermined count is equal to two.

3. A method according to claim 1, wherein determining comprises:
asserting a count completion signal upon reaching the predetermined count of cycles; and
sampling the count completion signal at the predetermined time.

4. A method according to claim 3, wherein sampling comprises loading the count completion signal into a state device.

5. A method according to claim 1, wherein the first oscillator signal serves as the source of the clock signal by default, and wherein selecting the first oscillator signal comprises continuing the default use of the first oscillator signal as the source of the clock signal.

6. A method of generating a clock signal for an electronic device, comprising:
monitoring an output of a first oscillator to detect the presence of a first oscillator signal, the first oscillator signal being generated by the first oscillator when the electronic device has a first configuration;
if the first oscillator signal is present, selecting the first oscillator signal as the source of the clock signal; and
if the first oscillator signal is determined not to be present, selecting a second oscillator signal as the source of the clock signal, the second oscillator signal being generated by a second oscillator when the electronic device has a second configuration,
wherein the first and second oscillators can each be enabled and disabled, and further comprising:
enabling the first oscillator and disabling the second oscillator during the monitoring of the output of the first oscillator; and
enabling the second oscillator and disabling the first oscillator upon the selection of the second oscillator signal as the source of the clock signal.

7. A method of generating a clack signal for an electronic device, comprising:
monitoring an output of a first oscillator to detect the presence of a first oscillator signal, the first oscillator signal being generated by the first oscillator when the electronic device has a first configuration;
if the first oscillator signal is present, selecting the first oscillator signal as the source of the clock signal; and
if the first oscillator signal is determined not to be present, selecting a second oscillator signal as the source of the clock signal, the second oscillator signal being generated by a second oscillator when the electronic device has a second configuration,
wherein the first and second oscillators can each be enabled and disabled, and further comprising:
enabling the first oscillator and disabling the second oscillator during the monitoring of the output of the first oscillator; and
enabling the second oscillator and disabling the first oscillator upon the selection of the second oscillator signal as the source of the clock signal,
wherein the first oscillator comprises a resistor-capacitor oscillator such that the frequency of the first oscillator signal is determined by the charging and discharging of a capacitor, and wherein disabling the first oscillator comprises turning off charging and discharging currents for the capacitor.

8. A method according to claim 7, wherein charging and discharging the capacitor comprises providing charge and discharge currents respectively to the capacitor, the charge and discharge currents each being a mirrored version of a predetermined reference current established when the electronic device has the first configuration.

9. A method according to claim 8, wherein the first configuration comprises the presence of a resistor connected to a terminal of the electronic device, the resistor establishing the value of the reference current.

10. A method according to claim 1, wherein the first configuration comprises the presence of a first component connected to the electronic device, and wherein the second configuration comprises the presence of a second component connected to the electronic device.

11. A method according to claim 1, wherein the first oscillator comprises a resistor-capacitor oscillator and the second oscillator comprises a crystal oscillator, the first configuration comprises the presence of a resistor connected to the electronic device, and the second configuration comprises the presence of a crystal connected to the electronic device.

12. A method of generating a clock signal for an electronic device, comprising:
monitoring an output of a first oscillator to detect the presence of a first oscillator signal, the first oscillator signal being generated by the first oscillator when the electronic device has a first configuration;
if the first oscillator signal is present, selecting the first oscillator signal as the source of the clock signal; and
if the first oscillator signal is determined not to be present, selecting a second oscillator signal as the source of the clock signal, the second oscillator signal being generated by a second oscillator when the electronic device has a second configuration,
wherein the first oscillator comorises a resistor-capacitor oscillator and the second oscillator comprises a crystal oscillator, the first configuration comprises the presence of a resistor connected to the electronic device, and the second configuration comprises the presence of a crystal connected to the electronic device, and
wherein the electronic device includes a terminal to which one but not both of the resistor and the crystal are connected to establish the respective configuration of the electronic device.

13. A method of generating an oscillator clock signal for an electronic device, comprising:
A) during an initial period:
(i) connecting an input/output terminal of the electronic device to a first oscillator, the first oscillator being operative to generate a first oscillator signal when a first circuit component is connected to the input/output terminal;
(ii) selecting the first oscillator signal as the source of the oscillator clock signal;
(iii) counting a first predetermined number of cycles of a phase-lock-loop (PLL) clock signal of a phase lock loop (PLL); and
(iv) counting a second predetermined number of cycles of the first oscillator signal; and
B) upon counting the first predetermined number of cycles of the PLL clock signal, determining whether the second predetermined number of cycles of the first oscillator signal have been counted, and if not, then:
(v) connecting the input/output terminal of the electronic device to a second oscillator, the second oscillator being operative to generate a second oscillator signal when a second circuit component is connected to the input/output terminal; and
(vi) selecting the second oscillator signal as the source of the oscillator clock signal.

14. A method according to claim 13, wherein the frequency of the PLL clock signal is approximately equal to the frequency of the oscillator clock signal, and wherein the first predetermined number is greater than the second predetermined number.

15. A circuit for generating a clock signal for an electronic device, comprising:
a first oscillator operative to generate a first oscillator signal when the electronic device has a first configuration;
a second oscillator operative to generate a second oscillator signal when the electronic device has a second configuration; and
monitoring and control circuitry operative:
(i) to monitor an output of the first oscillator to detect the presence of the first oscillator signal;
(ii) if the first oscillator signal is determined to be present, to select the first oscillator signal as the source of the clock signal; and
(iii) if the first oscillator signal is determined not to be present, to select the second oscillator signal as the source of the clock signal,
wherein the monitoring and control circuitry comprises:
a counter operative to count cycles of the first oscillator signal; and
timing circuitry operative to determine whether a predetermined count of cycles has been reached by a predetermined time,
further comprising a phase lock loop (PLL) circuit operative to generate a PLL clock signal, the PLL clock signal serving as the separate clock signal.

16. A circuit according to claim 15, wherein the monitoring and control circuitry comprises:
a counter operative to count cycles of the first oscillator signal; and
timing circuitry operative to determine whether a predetermined count of cycles has been reached by a predetermined time.

17. A circuit according to claim 15, wherein the counter comprises a first counter and wherein the timing circuitry comprises:
a second counter operative to count cycles of a separate clock signal to establish the predetermined time.

18. A circuit according to claim 16, wherein the predetermined count is equal to two.

19. A circuit for generating a clock signal for an electronic device, comprising:
a first oscillator operative to generate a first oscillator signal when the electronic device has a first configuration;
a second oscillator operative to generate a second oscillator signal when the electronic device has a second configuration; and
monitoring and control circuitry operative:
(i) to monitor an output of the first oscillator to detect the presence of the first oscillator signal;
(ii) if the first oscillator signal is determined to be present, to select the first oscillator signal as the source of the clock signal; and
(iii) if the first oscillator signal is determined not to be present, to select the second oscillator signal as the source of the clock signal, wherein the monitoring and control circuitry comprises:
a counter operative to count cycles of the first oscillator signal; and
timing circuitry operative to determine whether a predetermined count of cycles has been reached by a predetermined time,
wherein the counter is operative to assert a count completion signal upon reaching the predetermined count of cycles, and wherein the timing circuitry is operative to sample the count completion signal at the predetermined time.

20. A circuit according to claim 19, wherein the timing circuitry comprises:
a state device; and
a timer operative to load the count completion signal into the state device at the predetermined time.

21. A circuit according to claim 20, wherein the timer comprises a counter operative to count cycles of a separate clock signal to establish the predetermined time.

22. A circuit according to claim 15, wherein the monitoring and control circuitry comprises a multiplexer operative to select one of the first oscillator signal and the second oscillator signal as the source of the clock signal.

23. A circuit according to claim 15, wherein the monitoring and control circuitry further comprises multiplexer control circuitry operative to cause the multiplexer to select the first oscillator signal serves as the source of the clock signal by default, and to continue the default use of the first oscillator signal as the source of the clock signal if the first oscillator signal is determined to be present.

24. A circuit for generating a clock signal for an electronic device, comprising:
a first oscillator operative to generate a first oscillator signal when the electronic device has a first configuration;
a second oscillator operative to generate a second oscillator signal when the electronic device has a second configuration; and
monitoring and control circuitry operative:
(i) to monitor an output of the first oscillator to detect the presence of the first oscillator signal;
(ii) if the first oscillator signal is determined to be present, to select the first oscillator signal as the source of the clock signal; and
(iii) if the first oscillator signal is determined not to be present, to select the second oscillator signal as the source of the clock signal,
wherein the monitoring and control circuitry further comprises enabling circuitry operative:
to enable the first oscillator and disable the second oscillator during the monitoring of the output of the first oscillator; and
to enable the second oscillator and disable the first oscillator upon the selection of the second oscillator signal as the source of the clock signal.

25. A circuit for generating a clock signal for an electronic device comprising:
a first oscillator operative to generate a first oscillator signal when the electronic device has a first configuration;
a second oscillator operative to generate a second oscillator signal when the electronic device has a second configuration; and
monitoring and control circuitry operative:
(i) to monitor an output of the first oscillator to detect the presence of the first oscillator signal;
(ii) if the first oscillator signal is determined to be present, to select the first oscillator signal as the source of the clock signal; and
(iii) if the first oscillator signal is determined not to be present, to select the second oscillator signal as the source of the clock signal,
wherein the monitoring and control circuitry further comprises enabling circuitry operative:
to enable the first oscillator and disable the second oscillator during the monitoring of the output of the first oscillator; and
to enable the second oscillator and disable the first oscillator upon the selection of the second oscillator signal as the source of the clock signal,
wherein the first oscillator comprises a resistor-capacitor oscillator including a capacitor, charging circuitry, and discharging circuitry, the frequency of the first oscillator signal being determined by the charging and discharging of the capacitor by the charging and discharging circuitry respectively, and wherein the enabling circuitry comprises transistors operative to permit the flow of charging and discharging currents for the capacitor.

26. A circuit according to claim 25, wherein the charging and discharging circuitry are operative to generate charge and discharge currents respectively, the charge and discharge currents each being a mirrored version of a predetermined reference current established when the electronic device has the first configuration.

27. A circuit according to claim 26, wherein the first configuration comprises the presence of a resistor connected to a terminal of the electronic device, the resistor establishing the value of the reference current.

28. A circuit according to claim 18, wherein the first configuration comprises the presence of a first component connected to the electronic device, and wherein the second configuration comprises the presence of a second component connected to the electronic device.

29. A circuit according to claim 18, wherein the first oscillator comprises a resistor-capacitor oscillator and the second oscillator comprises a crystal oscillator, the first configuration comprises the presence of a resistor connected to the electronic device, and the second configuration comprises the presence of a crystal connected to the electronic device.

30. A circuit for generating a clock signal for an electronic device, comprising:
a first oscillator operative to generate a first oscillator signal when the electronic device has a first configuration;
a second oscillator operative to generate a second oscillator signal when the electronic device has a second configuration; and
monitoring and control circuitry operative:
(i) to monitor an output of the first oscillator to detect the presence of the first oscillator signal;
(ii) if the first oscillator signal is determined to be present, to select the first oscillator signal as the source of the clock signal; and
(iii) if the first oscillator signal is determined not to be present to select the second oscillator signal as the source of the clock signal,
wherein the first oscillator comprises a resistor-capacitor oscillator and the second oscillator comprises a crystal oscillator, the first configuration comprises the presence of a resistor connected to the electronic device, and the second configuration comprises the presence of a crystal connected to the electronic device, and wherein the electronic device includes a terminal to which one but not both of the resistor and the crystal are connected to establish the respective configuration of the electronic device.

31. A circuit according to claim 29, wherein the resistor-capacitor oscillator comprises:

a timing capacitor;

a current reference circuit operative to generate charge and discharge currents for the timing capacitor, the respective values of the charge and discharge currents being dictated by the value of the resistor connected to the electronic device;

charge and discharge transistors operative to provide the charge and discharge currents respectively to the timing capacitor; and a comparator operative to detect the relationship between the voltage of the capacitor and a predetermined voltage, the comparator generating an output signal provided to the charge and discharge transistors so as to cause oscillatory operation thereof;

and wherein the first oscillator signal is derived from the output signal of the comparator.

32. A circuit for generating an oscillator clock signal for an electronic device, comprising:

a phase lock loop (PLL) operative to generate a PLL clock signal;

a first oscillator operative to generate a first oscillator signal when a first circuit component is connected to an input/output terminal of the electronic device;

a second oscillator operative to generate a second oscillator signal when a second circuit component is connected to the input/output terminal of the electronic device; and monitoring and control circuitry operative:

A) during an initial period:
  (i) to connect the input/output terminal of the electronic device to the first oscillator;
  (ii) to select the first oscillator signal as the source of the oscillator clock signal;
  (iii) to count a first predetermined number of cycles of the PLL clock signal of a phase lock loop (PLL); and
  (iv) to count a second predetermined number of cycles of the first oscillator signal; and B) upon counting the first predetermined number of cycles of the PLL clock signal, to determine whether the second predetermined number of cycles of the first oscillator signal have been counted, and if not, then:
  (v) to connect the input/output terminal of the electronic device to the second oscillator; and
  (vi) to select the second oscillator signal as the source of the oscillator clock signal.

33. A circuit according to claim 32, wherein the frequency of the PLL clock signal is approximately equal to the frequency of the oscillator clock signal, and wherein the first predetermined number is greater than the second predetermined number.

* * * * *